United States Patent
Breedvelt-Schouten et al.

(10) Patent No.: US 10,171,773 B2
(45) Date of Patent: *Jan. 1, 2019

(54) DYNAMIC VIDEO IMAGE MANAGEMENT

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/006,057

(22) Filed: Jun. 12, 2018

(65) Prior Publication Data
US 2018/0295325 A1 Oct. 11, 2018

Related U.S. Application Data

(63) Continuation of application No. 16/002,014, filed on Jun. 7, 2018, which is a continuation of application
(Continued)

(51) Int. Cl.
*H04N 7/14* (2006.01)
*H04N 5/00* (2011.01)
(Continued)

(52) U.S. Cl.
CPC ............. *H04N 7/15* (2013.01); *G06T 7/00* (2013.01); *H04N 5/00* (2013.01); *H05K 999/99* (2013.01); *G06T 2207/30201* (2013.01)

(58) Field of Classification Search
CPC combination set(s) only.
See application file for complete search history.

(56) References Cited

U.S. PATENT DOCUMENTS 5,319,449 A 6/1994 Saito et al.
7,706,576 B1 4/2010 Beck et al.
(Continued)

FOREIGN PATENT DOCUMENTS

CN 201028460 Y 2/2008
CN 204761551 U 11/2015

OTHER PUBLICATIONS

Wikimedia Foundation, Inc.; "Per-pixel lighting"; <https://en.wikipedia.org/wiki/Per-pixel_lighting>.
(Continued)

*Primary Examiner* — Joseph J Nguyen
(74) *Attorney, Agent, or Firm* — L. Jeffrey Kelly

(57) ABSTRACT

Disclosed aspects relate to dynamic video image management. A set of dynamic image quality factors may be collected with respect to a dynamic video image. A set of display parameter values may be determined based on the set of dynamic image quality factors. The set of display parameter values may be of a set of display parameter values for a set of computing assets. The set of display parameter values may be determined to benefit the set of dynamic image quality factors with respect to the dynamic video image. The set of computing assets may be configured using the set of display parameter values. The set of computing assets may be configured to benefit the set of dynamic image quality factors with respect to the dynamic video image.

12 Claims, 7 Drawing Sheets

Related U.S. Application Data

No. 15/899,424, filed on Feb. 20, 2018, now Pat. No. 10,044,981, which is a continuation of application No. 15/795,323, filed on Oct. 27, 2017, now Pat. No. 10,075,675, which is a continuation of application No. 15/730,788, filed on Oct. 12, 2017, now Pat. No. 9,955,117, which is a continuation of application No. 15/375,469, filed on Dec. 12, 2016, now Pat. No. 9,883,141.

(51) Int. Cl.
*H04N 7/15* (2006.01)
*G06T 7/00* (2017.01)

(56) References Cited

U.S. PATENT DOCUMENTS

| | | | |
|---|---|---|---|
| 9,513,724 | B2 | 12/2016 | Hirsch |
| 9,883,141 | B1 | 1/2018 | Breedvelt-Schouten et al. |
| 9,955,117 | B1 | 4/2018 | Breedvelt-Schouten et al. |
| 2004/0261113 | A1 | 12/2004 | Paul et al. |
| 2007/0272734 | A1 | 11/2007 | Lipton et al. |
| 2009/0213746 | A1 | 8/2009 | Ariyoshi et al. |
| 2010/0189429 | A1 | 7/2010 | Butterwoth |
| 2011/0080421 | A1 | 4/2011 | Capener |
| 2011/0180541 | A1 | 7/2011 | Becklin |
| 2011/0181541 | A1 | 7/2011 | Kuo |
| 2012/0001960 | A1 | 1/2012 | Herz et al. |
| 2013/0042279 | A1 | 2/2013 | Sato et al. |
| 2013/0050233 | A1 | 2/2013 | Hirsch |
| 2013/0221855 | A1 | 8/2013 | Lazaridis et al. |
| 2013/0235073 | A1 | 9/2013 | Jaramillo et al. |
| 2014/0285699 | A1 | 9/2014 | Kato |
| 2015/0287389 | A1 | 10/2015 | Mese et al. |
| 2016/0104454 | A1 | 4/2016 | Huang |
| 2016/0260203 | A1 | 9/2016 | He et al. |

OTHER PUBLICATIONS

Microsoft Corporation; "Product Help"; <https://www.microsoft.com/hardware/en-us/help/support/how-to/webcam/adjust-settings>.

Pending U.S. Appl. No. 15/795,323, filed Oct. 27, 2017, entitled: "Dynamic Video Image Management", 47 pages.

Pending U.S. Appl. No. 15/899,420, filed Feb. 20, 2018, entitled: "Dynamic Video Image Management", 45 pages.

Pending U.S. Appl. No. 15/899,424, filed Feb. 20, 2018, entitled: "Dynamic Video Image Management", 45 pages.

Pending U.S. Appl. No. 16/002,014, filed Jun. 7, 2018, entitled: "Dynamic Video Image Management", 47 pages.

IBM: List of IBM Patents or Patent Applications Treated as Related (Appendix P), Jun. 12, 2018, 2 pages.

600

610

630

700

710

730

DYNAMIC VIDEO IMAGE MANAGEMENT

BACKGROUND

This disclosure relates generally to computer systems and, more particularly, relates to dynamic video image management. Video images may be used to facilitate connections between individuals. The use of video images to communicate is increasing. As the number of individuals using video communication increases, the need for dynamic video image management may also increase.

SUMMARY

Aspects of the disclosure relate to the management of dynamic video images such as those images of a real-time video conference. Disclosed aspects may measure the quality of a facial image during a live online video recording. Features may modify settings or parameters such as brightness and color of the display screen in order to improve the quality of the video image of the user. Modifications may be made to the presentation of the display screen and the content of the open windows, as well as other aspects. The modifications may, for example, regulate the light emission from the screen in order to positively impact the white balance and temperature of the image. Features of dynamic video image management may facilitate, in an automated or streamlined fashion, the quality of the video image. Accordingly, an individual may not need to manually modify their surroundings, such as closing the curtains or moving lights, to change the quality of the video image.

Disclosed aspects relate to dynamic video image management. A set of dynamic image quality factors may be collected with respect to a dynamic video image. A set of display parameter values may be determined based on the set of dynamic image quality factors. The set of display parameter values may be of a set of display parameter values for a set of computing assets. The set of display parameter values may be determined to benefit the set of dynamic image quality factors with respect to the dynamic video image. The set of computing assets may be configured using the set of display parameter values. The set of computing assets may be configured to benefit the set of dynamic image quality factors with respect to the dynamic video image.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
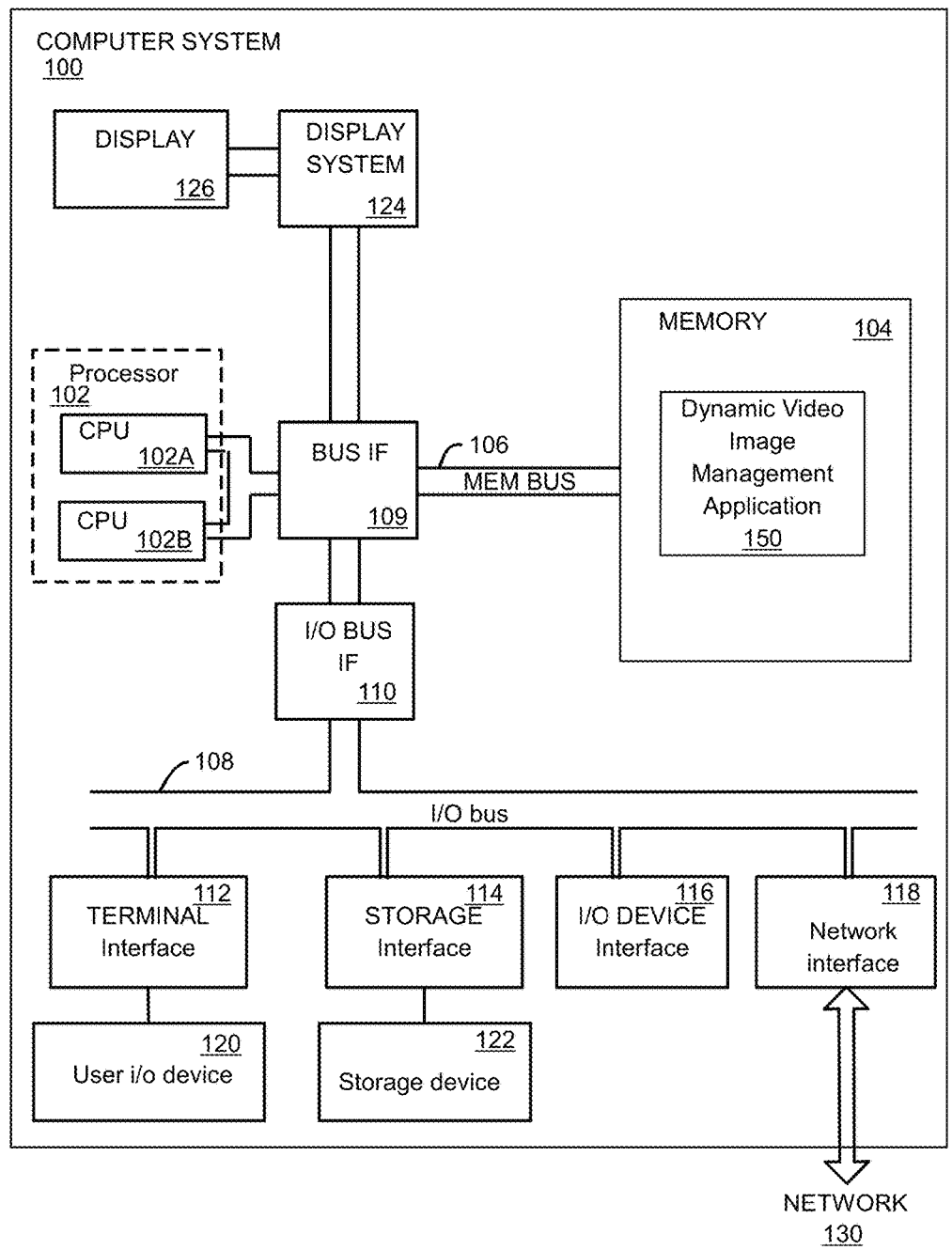
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to the management of dynamic video images such as those images of a real-time video conference. Disclosed aspects may measure the quality of a facial image during a live online video recording. Features may modify settings or parameters such as brightness and color of the display screen in order to improve the quality of the video image of the user. Modifications may be made to the presentation of the display screen and the content of the open windows, as well as other aspects. The modifications may, for example, regulate the light emission from the screen in order to positively impact the white balance and temperature of the image. Features of dynamic video image management may facilitate, in an automated or streamlined fashion, the quality of the video image. Accordingly, an individual may not need to manually modify their surroundings, such as closing the curtains or moving lights, to change the quality of the video image.

The use of video communication through computing devices is becoming more and more popular. When a user is communicating with someone face-to-face online, the colors, brightness, and other factors may be desired to be high quality and allow the user to look their best. The user could close the curtains or adjust the lighting in the room to improve the quality of the video image, but this may have challenges. Also, the user may be multi-tasking and may have multiple devices, applications, operating systems, or windows in use at the same time. A manual adjustment of the environment may not sufficiently or efficiently improve the quality of the video image for the plurality of assets in use. Aspects described herein may provide a more direct method to improve facial representation during a video communication.

Aspects of the disclosure include a system, method, and computer program product for dynamic video image management. A set of dynamic image quality factors may be collected with respect to a dynamic video image. A set of display parameter values may be determined based on the set of dynamic image quality factors. The set of display parameter values may be of a set of display parameter values for a set of computing assets. The set of display parameter values may be determined to benefit the set of dynamic image quality factors with respect to the dynamic video image. The set of computing assets may be configured using the set of display parameter values. The set of computing assets may be configured to benefit the set of dynamic image quality factors with respect to the dynamic video image.

In embodiments, disclosed aspects may select a set of image quality factors from a group consisting of a white balance factor, a temperature factor, a saturation factor, and other image quality factors. Various embodiments may capture a set of facial-related features using a set of camera sensors to collect the set of image quality factors. In certain embodiments, features may select a set of display parameters from a group consisting of a display illumination parameter, a color parameter, a brightness parameter, a contrast parameter, or other display parameters. Certain embodiments may structure the set of computing assets to include a plurality of computing devices, a plurality of computing devices with separate operating systems, a plurality of separate application windows, or a plurality of computing devices with a plurality of separate operating systems with a plurality of different application windows. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory. For instance, bandwidth may be saved through dynamic video image management. Poor quality of a video image may require the user to keep changing their location in order to find a location that results in better image quality. If, for example, the smartphone of the user is not connected to a wireless internet source, the user may be wasting bandwidth on their smartphone while looking for a better location. If dynamic video image management is used, the user may not waste bandwidth on their smartphone because they may not have to search for a location that results in a quality video image. Other methods of conserving bandwidth and other resources may also be possible.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an 110 bus 108, bus interface unit 109, and an 110 bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a dynamic video image management application 150. In embodiments, the dynamic video image management application 150 may include instructions or statements that execute on the processor 102 or instructions or statements that are interpreted by instructions or statements that execute on the processor 102 to carry out the functions as further described below. In certain embodiments, the dynamic video image management application 150 is implemented in hardware via semiconductor devices, chips, logical gates, circuits, circuit cards, and/or other physical hardware devices in lieu of, or in addition to, a processor-based system. In embodiments, the dynamic video image management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
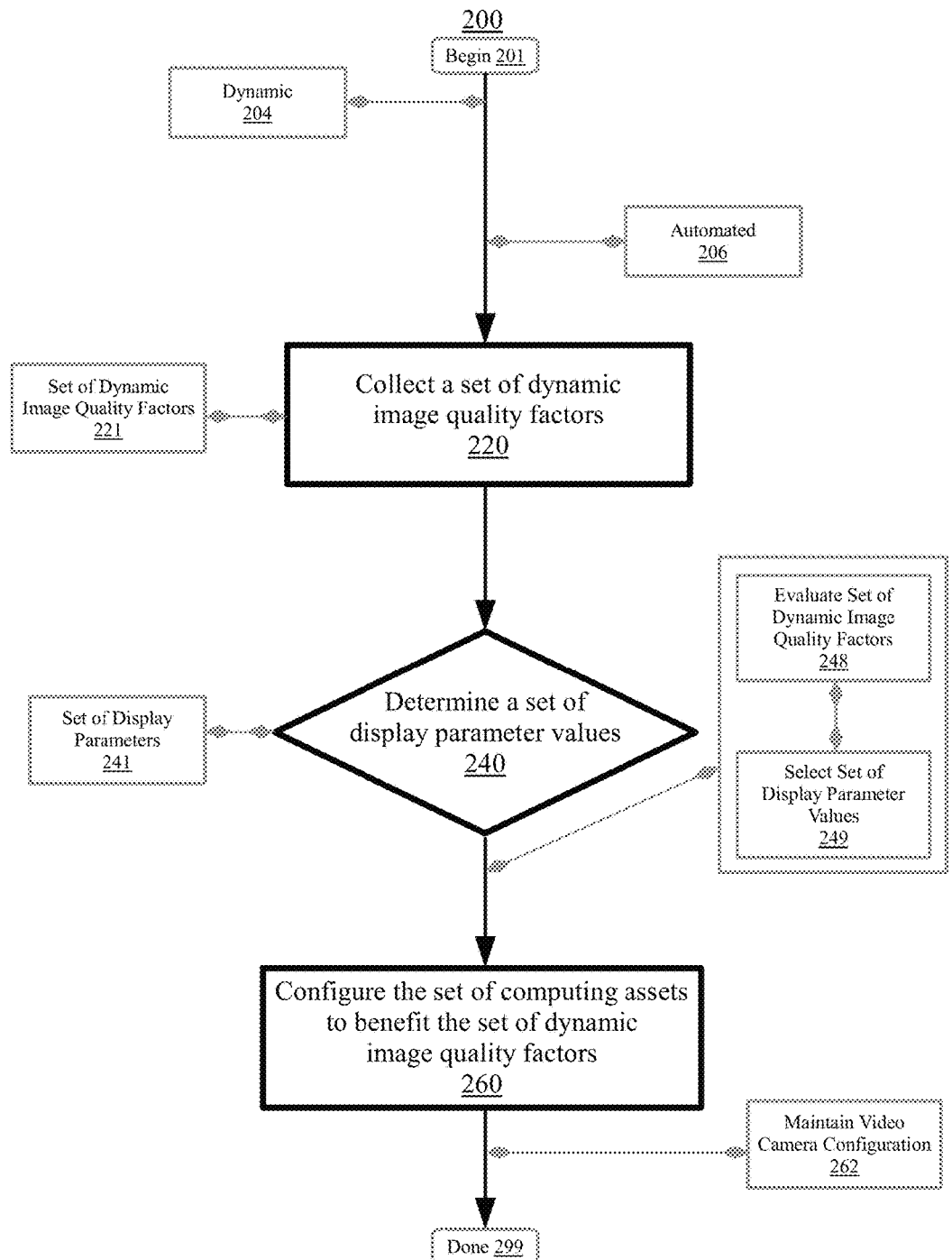
FIG. 2 is a flowchart illustrating a method of dynamic video image management, according to embodiments.

FIG. 2 is a flowchart illustrating a method 200 for dynamic video image management. The method 200 may begin at block 201. In embodiments, the collecting, the determining, the configuring, and the other steps described herein may each occur in a dynamic fashion at block 204. The collecting, the determining, the configuring, and the other steps described herein may occur in a dynamic fashion to streamline dynamic video image management. The steps described herein may be performed simultaneously (e.g., collecting a set of dynamic image quality factors while the user records a video image) in order to streamline (e.g., facilitate, promote, enhance) dynamic video image management. Other methods of performing the steps described herein are also possible. In embodiments, the collecting, the determining, the configuring, and the other steps described herein may each occur in an automated fashion at block 206. The collecting, the determining, the configuring, and the other steps described herein may occur in an automated fashion without user intervention. In embodiments, the steps described herein may be carried out by an internal dynamic video image management module maintained in a persistent storage device of a local computing device. In certain embodiments, the steps described herein may be carried out by an external dynamic video image management module hosted by a remote computing device or server. In this way, aspects of dynamic video image management may be performed using automated computer machinery without manual action. Other methods of performing the steps described herein are also possible.

At block 220, a set of dynamic image quality factors may be collected with respect to a dynamic video image. Collecting may include receiving, gathering, capturing, or otherwise accumulating a set of dynamic image quality factors with respect to a dynamic video image. A video image may be an electronic medium for the recording, copying, playback, broadcasting, and display of a visual medium (e.g., video chat, live video broadcast, video conference). A dynamic video image may be a live video, a streaming video, or other video image occurring continually or in real-time. A set of dynamic image quality factors may be collected with respect to a dynamic video image. The set of dynamic quality image factors may be elements, features, details, characteristics, or other aspects that indicate the quality of an image continually or in real-time (e.g., live, streaming, ongoing, on-the-fly).

In embodiments, the set of dynamic image quality factors may be selected from a group at block 221. The set of dynamic image quality factors may include a display illumination factor. The illumination factor may indicate the level of light or lack thereof in a video image (e.g., 100% level of light on a sunny day, 0% level of light at night). For example, a video chat occurring outside on a sunny day may have a high level of illumination, and the reflection of the light from the sun may cause the nose of the user to appear shiny. The set of dynamic image quality factors may include a white balance factor. The white balance factor may indicate the level of adjustment of colors required to attain a more realistic or natural-looking video image (e.g., 95% adjustment in an unnatural-looking image, 10% adjustment in a natural-looking image). For example, a video image of a user in their office building with a low level of white balance may cause their skin tone to appear more yellow and unnatural. The set of dynamic image quality factors may include a color factor. The color factor may indicate the perceived shade, pigment, or hue of an image (e.g., gray, green, orange). For example, a video image recorded outside on a cloudy day may result in the facial features of the user being tinted gray. The set of dynamic image quality factors may include a temperature factor. The temperature factor may indicate the hue of a particular light source (e.g., cool blue light, warm yellow light). For example, a video image recorded in a candle-lit room with a large amount of warm yellow light may cause the teeth of a user to appear yellow.

In various embodiments, the set of dynamic image quality factors may include a brightness factor. The brightness factor may indicate the level that a source appears to be radiating or reflecting light (e.g., sun reflecting 100% light, dark room reflecting 0% light). For example, a video image recorded in a well-lit room may have a high level of brightness and may result in the face of the user appearing unnaturally white. The set of dynamic image quality factors may include a contrast factor. The contrast factor may indicate the difference between two specific points or areas in a video image (e.g., different shades of a color, different light intensities, different colors). For example, a high level of contrast may cause half of the face of the user to appear very dark and the other half to appear very light. The set of dynamic image quality factors may include a saturation factor. The saturation factor may indicate the depth or intensity of a color, or the degree to which a color differs from white (e.g., bright yellow, dull blue). For example, a video image with high saturation may cause the blue eyes of the user to appear a brighter shade of blue than normal.

Consider the following example. A user may be participating in a video chat with another user on their laptop computer. A set of dynamic image quality factors may be collected based on the dynamic video image, in this case the video chat. The user may be in a dark room. The brightness of the screen may cause their face to appear white in the video image on the device of the other user. The dark room may cause the facial features of the user to have less contrast in the video image on the device of the other user. The darkness of the room may also reduce saturation of color from the facial features of the user. The dynamic image quality factors sensed and processed by features may include a high level of brightness being emitted from the laptop screen (e.g., 85% brightness), low contrast due to the darkness of the room (e.g., 2% contrast), and low saturation as a result of the white light of the laptop screen (e.g., 3% saturation). Other methods of collecting a set of dynamic image quality factors may also occur.

At block 240, a set of display parameter values for a set of computing assets may be determined based on the set of dynamic image quality factors. Determining may include establishing, calculating, computing, formulating, resolving, or otherwise ascertaining a set of display parameter values for a set of computing assets. A computing asset may be hardware (e.g., equipment such as a display screen/monitor, apparatus such as a video conferencing machine, a device such as a laptop/tablet/smartphone) or software (e.g., an operating system, an application program, a virtual machine, a portion thereof) related to a computer. The computing assets may include one or more windows (e.g., tabs in an internet browser, spreadsheets, documents, presentations, a combination such as an open tab and a document, a combination such as a spreadsheet and a presentation), one or more applications (e.g., video chats, music streaming while video chatting, spreadsheet open while video chatting), one or more display screens (e.g., projecting device, desktop computer monitor), one or more computing devices (e.g., desktop computer, tablet computer, smartphone, smartwatch), or other computing assets. A set of display parameter values may be numerical, computed, or other resolved values related to display (e.g., a brightness parameter to control the brightness factor, a contrast parameter to manage the contrast factor, a white balance parameter to control the white balance factor). The set of display parameter values may be determined based on, contingent on, or otherwise connected with the set of dynamic image quality factors.

In embodiments, the set of display parameters may be selected from a group at block 241. The set of display parameters may include a display illumination parameter. The display illumination parameter may change the level of light or lack thereof in a video image (e.g., increasing the level of light of a video image in a dark room, decreasing the level of light of a video image recorded in a sunny room). For example, increasing the illumination in a video image recorded in a dark room may cause the face of the user to appear lighter and more visible. The set of display parameters may include a white balance parameter. The white balance parameter may adjust the colors in a video image in order to attain a more realistic or natural-looking video image (e.g., adjusting the color of the face and hair of a user to counter white light emitted from a laptop). For example, increasing the white balance factor of a video image recorded in a bright white room may cause the skin tone of a user to appear more natural looking. The set of display parameters may include a color parameter. The color parameter may change the perceived shade, pigment, or hue of a video image (e.g., adjusting the color of the walls of a room in a video image to decrease the red pigmentation). For example, decreasing the color factor of a video image recorded near several trees with green leaves may result in the skin tone of the user appearing less green. The set of display parameters may include a temperature parameter.

The temperature parameter may change the hue of a particular light source in a video image (e.g., countering the warm yellow light emitted from a candle in a video image by adjusting the temperature to a cooler one). For example, increasing the warmth of a video image recorded in a bright room lit with fluorescent lights may result in the face of the user appearing less blue.

In various embodiments, the set of display parameters may include a brightness parameter. The brightness parameter may change the level of perception that a source in a video image appears to be radiating or reflecting light (e.g., decreasing the brightness of the sun shining in a video image). For example, a video image in which the brightness factor is decreased may result in the face of a user appearing less white and more natural looking. The set of display parameters may include a contrast parameter. The contrast parameter may change the level of difference between two specific points or areas in a video image (e.g., increasing the distinction between the facial features of a user recording a video image in a dark room). For example, decreasing the contrast factor of a video image may cause the dark half of the face of a user to lighten to match the lighter half of the face of the user. The set of display parameters may include a saturation parameter. The saturation parameter may change the depth or intensity of a color, or the degree to which a color differs from white (e.g., intensifying the shade of green of the grass in a video image on a cloudy day). For example, decreasing the saturation factor of a video image may cause the bright blue eyes of the user to appear more similar to the natural, duller blue eye color of the user. The set of display parameter values may be determined to benefit the set of dynamic image quality factors with respect to the dynamic video image (e.g., increasing a brightness factor in a dark room, decreasing a contrast factor in a bright room).

Consider the following example. A user may be giving a presentation at work using a video conference application. The user may have one display screen for the video chat, and one or several others for presentations and spreadsheets. A set of display parameter values may be determined for the display screens. The dynamic image quality factors may include a low level (e.g., 15%) of brightness, a cool temperature (e.g., 70% cool light and 30% warm light), and a low level (e.g., 20%) of saturation. The described dynamic image quality factors may cause the video image of the conference call to appear darker, bluer, and dully colored. The set of display parameter values may be calculated for the display screens to benefit the set of dynamic image quality factors. The level of brightness (e.g., 15%) may be compared with a predetermined desired level of brightness (e.g., 80%). The level of temperature may be calculated using a threshold level of temperature (e.g., a minimum of 20% difference between the level of cool light and the level of warm light). The level of saturation (e.g., 20%) may be compared to a predetermined desired level of saturation (e.g., 65%). The set of display parameter values may include an increase in the level of brightness by 65% to reach the desired level of brightness, a better balance in the temperature (e.g., 40% blue light and 60% yellow light to attain a desired threshold level of temperature), and a higher level of saturation (e.g., increase the saturation from 20% to 65% to achieve the desired level of saturation). The set of display parameter values may benefit the set of dynamic image quality factors. Raising the level of brightness and saturation and balancing the level of temperature may benefit the poor display quality that the user is experiencing. Other methods of determining the set of display parameter values are also possible.

In embodiments, the set of dynamic image quality factors may be evaluated at block 248. Evaluating may include gauging, assessing, calculating, or otherwise examining the set of dynamic image quality factors. The set of dynamic image quality factors may be evaluated with respect to a set of image quality factor benchmarks. The set of image quality factor benchmarks may include a threshold level of quality, a predetermined desired level of quality, a historically-derived value such as a mean/median/mode, or other benchmarks (e.g., the illumination factor of a video image must exceed 50%, the desired level of contrast of a video image is 65%). The set of dynamic image quality factors may be evaluated to benefit presentation of the set of facial-related features. The set of dynamic image quality factors (e.g., 30% brightness, 45% white balance) may be assessed in order to improve the quality of the video image with respect to the set of facial-related features of the user displayed in the video image.

Consider the following example. A user may be a participant in a video conference call in their workplace. The set of dynamic image quality factors may be collected from the video image of the conference call. The set of dynamic image quality factors may include a white balance factor of 15% and a saturation factor of 85%. The user and their surroundings may appear unnatural with a high intensity of color. The set of dynamic image quality factors may be evaluated with respect to a set of image quality factor benchmarks. The device of the user may have a desired value for the white balance factor of 60%. The device may also require the saturation level of the video image to fall in the range of 40-70%. The dynamic image quality factors may be compared to the image quality factor benchmarks. The white balance factor is much lower than the desired white balance factor value, so it may be determined that the white balance parameter should increase the level of white balance to at least 60%. The saturation factor does not fall in the required range, so it may be determined that the saturation parameter should decrease the saturation factor to at least a level of 70%. The predetermined white balance and saturation parameters may benefit presentation of the set of facial-related features. The set of display parameters may allow the facial-related features of the user to appear more natural with a lower intensity of color. Other methods of evaluating the set of dynamic image quality factors are also possible.

In embodiments, the set of display parameter values may be selected at block 249. Selecting can include resolving, choosing, adopting, or otherwise indicating the set of display parameter values. Selecting can include, for example, saving a data value (e.g., entering a digit/character in a data store), transmitting a data object (e.g., sending an object having metadata), routing a message (e.g., publishing a startup/wait expectation), or providing/performing/processing an operation (e.g., a notification). The set of display parameter values may be selected based on the evaluation of the set of dynamic image quality factors with respect to the set of image quality factor benchmarks. The set of dynamic image quality factors may be compared, evaluated, or otherwise analyzed with respect to the set of image quality factor benchmarks (e.g., a brightness factor of 10% determined to be less than a benchmark brightness factor of 50%, a color factor of 70% determined to be greater than a benchmark color factor of 40%, a contrast parameter of 60% determined to be equal to a benchmark contrast factor of 60%). The set of display parameter values may be selected to benefit presentation of the set of facial-related features. The set of display parameter values may be chosen or resolved in order to improve the video image quality, as well as the quality of video image with respect to facial-related features (e.g., brightness of skin tone, saturation of eye color).

Consider the following example. A user may be participating in a video chat with a friend in a dark room through a smartphone application. A set of dynamic image quality factors may be collected (e.g., an illumination level of 5%, a color factor level of 10%, and a saturation factor of 15%). The video image of the user may appear dark with little pigmentation or intensity of color. After the evaluation of the set of dynamic image quality factors with respect to a set of image quality factor benchmarks, a set of display parameter values may be determined. For example, the illumination level may need to be increased to 40%, the color level may need to be increased to 60%, and the saturation level may need to be increased to 35%, due to predetermined desired values and ranges. The set of display parameter values may be selected based on the evaluation of dynamic image quality factors. The illumination parameter may be selected to increase the illumination factor by 35%, the color parameter may be selected to increase the color of the video image by 50%, and the saturation parameter may be selected to increase the saturation factor by 20%. The set of display parameter values may benefit the quality of the video image. The user may appear less dark, more pigmented, and with a higher intensity of color on the display screen of their friend. Other methods of selecting the set of display parameter values are also possible.

At block 260, the set of computing assets may be configured using the set of display parameter values. The set of computing assets (e.g., one or more windows, applications, display screens, some combination thereof) may be modified, arranged, designed, or otherwise developed using the set of display parameter values (e.g., a color parameter, a brightness parameter, an illumination parameter). The set of display parameter values may be adjusted, selected, or chosen to carry out the configuring through the changing of a number (e.g., a change from 10% brightness to 30%, a change from 50% saturation to 25%), the selecting of a flavor from a listing/menu/group (e.g., low illumination, average illumination, high illumination), or a combination of quantity and flavor (e.g., a video image is tinted green instead of blue/red and is at a 30% level of green tint). The determined set of display parameter values may be modified or changed in order to benefit the set of dynamic image quality factors (e.g., changing the color parameter to increase the color factor, changing the illumination parameter to decrease the illumination factor) with respect to the dynamic video image. The modification of the set of display parameter values may raise the quality of a dynamic video image and in particular the set of dynamic image quality factors.

Consider the following example. A user is participating in a video conference call for work. A set of dynamic image quality factors may be collected, including a low level (e.g., 15%) of color, a low level (e.g., 25%) of contrast, and a high level (e.g., 80%) of white balance. The dynamic image quality factors collected may indicate that the video image of the user participating in the video conference call may not be a high quality image (e.g., nearly colorless, dull, natural-looking). The dynamic image quality factors collected (e.g., low color, low contrast, high white balance) may determine a set of display parameter values for a set of computing assets. The set of computing assets may include the laptop computer being used for the live video stream, as well as the tablet computer of the user, which the user has open to a slideshow presentation. The determined set of display parameter values may include the modification of the color parameter to increase the level of color on the display screen to a benchmark level of 45%, the modification of the contrast parameter to increase the level of contrast on the display screen to a desired level of 70%, and no modification to the white balance parameter, since the white balance is at the benchmark level of 80% and already looks natural. The set of computing assets (e.g., laptop computer, tablet computer) may be configured to benefit the set of dynamic image quality factors. The modification of the color parameter and contrast parameter, as well as the lack of modification to the white balance parameter to the laptop and tablet computers may raise the quality of the video image by changing the parameter values of the video image of the conference call. The user participating in the conference call may appear more vibrant and colorful, but still natural looking on the display screens of their coworkers.

Consider the following example. The user may be participating in a video chat with a friend under a tree with red leaves. The color of the red leaves may cause the user and their environment to appear to be tinted red (e.g., a red color factor of 70%). The determined set of display parameter values may indicate a modification to the color factor. To counter the tint from the red leaves, the color parameter may be modified by tinting the video image blue, green, or yellow. A green tint may be selected from a listing/menu as the modification for the video image instead of blue or yellow. The color parameter may introduce the green tint at a 30% level. The modification of the color parameter may cause the user to appear less red and more natural looking. Other methods of configuring the set of computing assets to benefit the set of dynamic image quality factors may also occur.

In embodiments, the video camera configuration may be maintained at block 262. Maintaining can include managing, preserving, or otherwise sustaining the video camera configuration. The video camera configuration may be maintained to configure the set of computing assets without changing a video camera configuration. The video camera configuration may be maintained to construct, arrange, or otherwise design the set of computing assets (e.g., display screen of a tablet, display screen of a projector) such that the set of computing assets may benefit the set of dynamic quality image factors without changing a video camera configuration. The video camera configuration (e.g., webcam, smartphone camera, projecting device) may be maintained while the display screen configuration may be altered or changed. For example, the color on the display screen may be increased while the level of color being recorded by the video camera remains the same.

Consider the following example. The set of dynamic image quality factors may be collected for a user participating in a video conference call at work. The set of dynamic image quality factors may indicate an imbalance in temperature factor (e.g., 20% warm yellow lighting and 80% cool blue lighting) and a lower-than-desired level of white balance (e.g., 10% white balance factor). The user may appear bluer and unnatural on the display screens of the devices of their colleagues. The set of display parameter values may be determined. The temperature parameter may be modified to create an even balance in the temperature factor (e.g., 50% warm light and 50% cool light). The white balance parameter may be modified to increase the white balance factor from 10% to a predetermined desired level of white balance (e.g., 75%). The set of computing assets may be configured using the determined white balance and temperature parameters to benefit the set of dynamic image quality factors. The user may appear less blue and more natural looking on the display screens of the devices of their colleagues. This configuration may occur without changing or altering the video camera configuration in any way. The video camera may still record the user as blue and unnatural, but the devices may display the user as less blue and more natural. Other methods of maintaining the video camera configuration may also be possible.

Method 200 concludes at block 299. Aspects of method 200 may provide performance or efficiency benefits for managing dynamic video images. Aspects may save resources such as bandwidth, disk, processing, or memory. As an example, aspects may save processing time relative to changing video camera configuration (e.g., instead of changing both display screen and video camera, change merely one or more display parameters).

Figure 3:
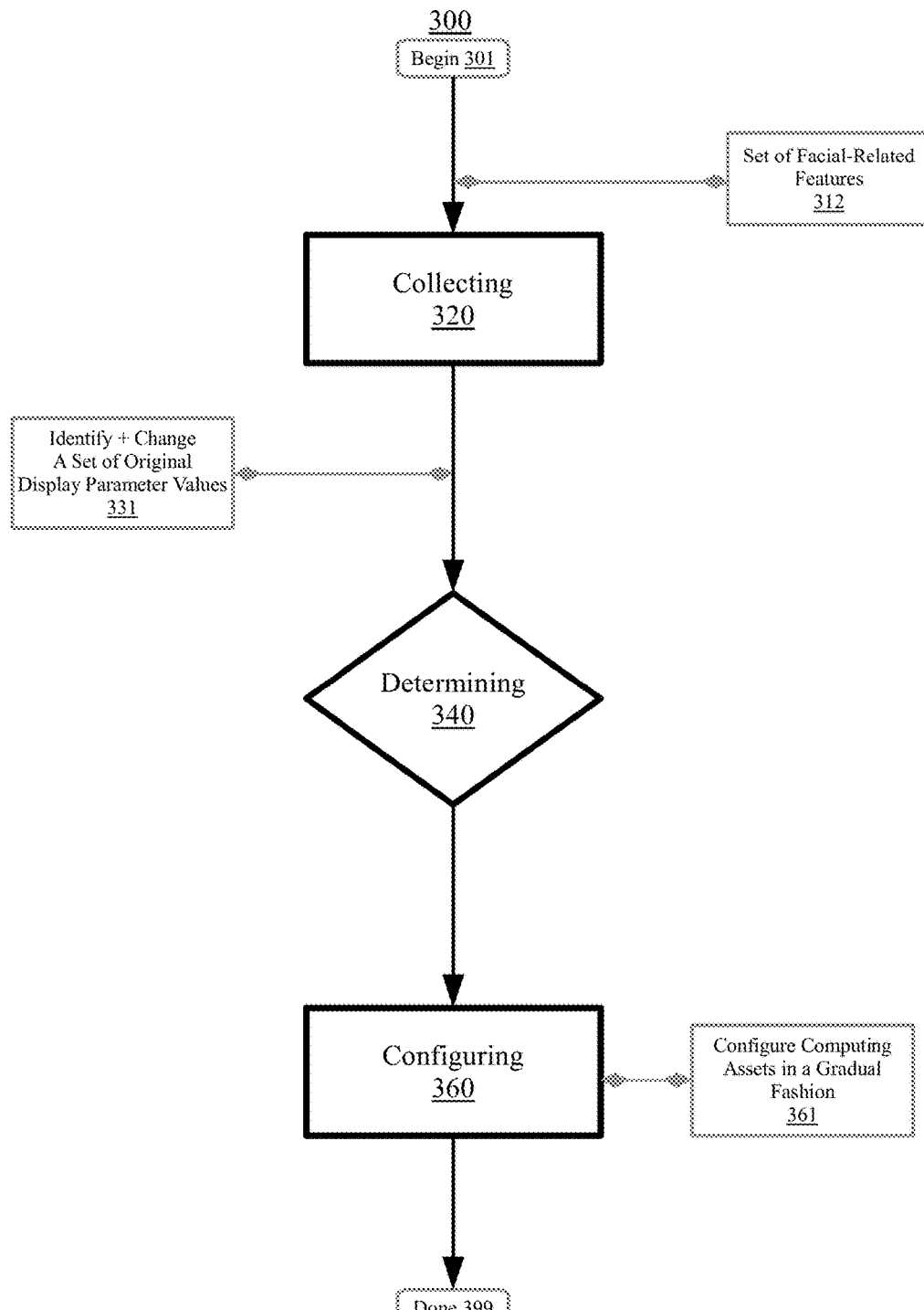
FIG. 3 is a flowchart illustrating a method of dynamic video image management, according to embodiments.

FIG. 3 is a flowchart illustrating a method 300 of dynamic video image management. Aspects of method 300 may be similar or the same as aspects of method 200, and aspects may be utilized interchangeably with one or more methodologies described herein. The method 300 may begin at block 301. At block 320, a set of dynamic image quality factors may be collected with respect to a dynamic video image. At block 340, a set of display parameter values may be determined based on the set of dynamic image quality factors. The set of display parameter values may be of a set of display parameters for a set of computing assets. The set of display parameter values may be determined to benefit the set of dynamic image quality factors with respect to the dynamic video image. At block 360, the set of computing assets may be configured to using the set of display parameter values. The set of computing assets may be configured to benefit the set of dynamic image quality factors with respect to the dynamic video image.

In embodiments, a set of facial-related features may be captured at block 312. Capturing may include acquiring, obtaining, securing, or otherwise collecting the set of facial-related features. The set of facial-related features may be captured using a set of camera sensors. The set of camera sensors may include a set of sensors that detect and deliver the information that constitutes a video image (e.g., webcam, smartphone camera). Facial-related features can be captured via facial recognition software (e.g., three-dimensional analysis, skin texture analysis, thermal cameras), facial motion capture software (e.g., eye movement tracking), or other types of software. The set of facial-related features may include aspects that impact a quality of a facial image (e.g., low level of contrast between nose and cheeks, high level of saturation of skin tone). The set of facial-related features may include the face (e.g., eyes, nose, skin tone), the context or the environment (e.g., color of the walls in the room, brightness of the light in the room), or other aspects captured in the video image. The set of facial-related features may be associated with the dynamic video image to collect the set of dynamic image quality factors. The set of facial-related features may accompany or otherwise be combined with the dynamic video image in order to collect the set of dynamic image quality factors.

Consider the following example. A user may be participating in a video chat with friends. A set of facial-related features may be captured for the individual user with a set of camera sensors (e.g., the webcam application). For example, the light shining through the window in the room may cause the nose of the user to appear shiny. The low level of white balance in the room may cause the teeth of the user to appear yellow. These captured facial-related features may indicate a low quality video image, as the user may not want a shiny nose and yellow teeth to appear in the video image. These facial-related features may be associated with the video image (e.g., web cam conversation). The association of the facial-related features with the video image may facilitate the collection of the set of dynamic image quality factors to increase the quality of the video image. For example, the shiny nose may indicate a high level of illumination that may need to be decreased. The yellow teeth of the user may indicate an unnatural environment with a low level of white balance. The white balance factor may need to be increased. The set of computing assets may be configured to lower the illumination factor and raise the white balance factor. The configuration of the computing assets may reduce the shine of the nose of the user and cause their teeth to appear whiter. The quality of the video image may be increased. Other methods of capturing a set of facial-related features may also be possible.

In embodiments, the identification and change of a set of original display parameter values may occur at block 331. A set of original display parameter values may be identified in advance of determining the set of display parameter values of the set of display parameters for the set of computing assets. Identifying can include analyzing, determining, establishing, or otherwise selecting a set of original display parameter values. The set of original display parameter values may be predetermined or benchmark (e.g., historical mean/median/mode) display parameter values that are preset for a set of computing assets (e.g., a tablet requires a level of at least 40% contrast, a projector desires a level of brightness that does not exceed 80%). The set of original display parameter values may be identified for the set of computing assets with respect to the dynamic video image. The set of original display parameter values of the set of display parameters for the set of computing assets may be changed to the set of display parameter values of the set of display parameters for the set of computing assets. Changing may include increasing, decreasing, or otherwise modifying the set of original display parameter values to the set of display parameter values. The set of original display parameter values may be changed to benefit the set of dynamic image quality factors with respect to the dynamic video image. The original display parameter values may need to be modified in order to provide the viewer with an enhanced quality video image. The set of original display parameter values may be identified and changed manually (e.g., by the user), in an automated (e.g., without user intervention) manner, or a combination of manually and automated.

Consider the following example. A user may frequently video chat in a dark room in their home. The original display parameter values may include increasing the brightness and illumination factors to a 90% level to allow for a video image with enhancement(s). The user may begin a video chat conversation with a friend in this room. The brightness and illumination factors may be at a 90% level to counter the darkness of the room. The 90% brightness and illumination factors may be identified to be the set of original display parameter values. The user may have installed a new light in this room, which may naturally raise the brightness and illumination in the room. With the new light and the original display parameter values, the video image may appear too bright and illuminated. The set of original display parameter values (e.g., 90% brightness, 90% illumination) may be changed to benefit the set of dynamic image quality factors. The brightness factor may be lowered from 90% to 75% and the illumination factor may be lowered from 90% to 50%. The lowering of the brightness and illumination factors may benefit the set of dynamic image quality factors and cause the user to look more natural and less bright.

Consider the following example. A user may be participating in a video chat with a possible employer for a job interview. The user may have opened the video chat application for the first time and realize the video image has a low level of quality. The user may appear too saturated (e.g., predetermined high level of saturation instead of average level) causing their eye color to look unnaturally intense. The high level of saturation may be the default configuration for the dynamic image quality factors (e.g., the preset configuration of the video chat application, the original display parameter value). While the video chat is in use, disclosed aspects may begin as a plug-in in the application. A set of dynamic image quality factors (e.g., predetermined high level of saturation) may be collected, and the set of display parameter values may be determined. The set of display parameter values may include the selection (e.g., in a manual fashion, in an automated fashion) of an average level of saturation from a listing/menu. The modification or change of the saturation parameter may lower the intense color of the eyes of the user and may increase the quality of the video image. In this way, the original display parameter values may be identified and subsequently changed. Other methods of identifying and changing a set of original display parameter values may also be possible.

In embodiments, the set of computing assets may be configured in a gradual fashion at block 361. Configuring can include constructing, arranging, composing, or otherwise designing the set of computing assets in a gradual fashion. The configuring of the set of computing assets may occur at a moderate, measured, or slow pace (e.g., not drastically changing the brightness parameter, incrementally changing the saturation parameter). The set of computing assets may be configured in a gradual fashion to manage the dynamic video image based on a set of incremental changes to the set of display parameter values. The display parameter values may be modified gradually or incrementally in order to manage or improve the dynamic video image (e.g., increasing the contrast in a video image slowly to distinguish between the nose and cheeks of the user, decreasing the cool temperature of the lighting in a video image moderately to improve the hue of the light bulbs). For example, a display parameter value may be on a 0 through 100 scale, and every second, the display parameter value may be increased by one notch or unit until a target display parameter value is reached. As another example, a display parameter value on a 0 through 100 scale may be increased by one notch and dynamically (e.g., on-the-fly, ongoing) analyzed after each increase to determine whether or not the dynamic image quality factor is at a desired level.

Consider the following example. The set of computing assets may include the tablet of a user who is video chatting with a friend in a dark room. The dynamic image quality factors may indicate a brightness level of 20% as well as a need to increase the brightness factor of the display screen. The display parameter may be determined to increase this brightness factor by 70% to a target brightness level of 90%. The dynamic video image may be managed such that the brightness factor is not increased by 70% instantaneously. The tablet of the user may be configured such that the brightness parameter increases the brightness of the display by a 10% increment every minute until the target level of 90% brightness is achieved. The increase of the brightness parameter may also be dynamically analyzed. The dynamic image quality factors may be evaluated after every incremental increase. After six minutes, the level of brightness may reach 80%. Upon analysis, it may be determined that an 80% level of brightness is sufficient to produce a quality video image. The display parameter value may be maintained (e.g., not be modified anymore) once it has reached a sufficient (e.g., 80%) level of brightness. In this way, the brightness of the video image may not be drastically increased over a short period of time. The modification of the brightness parameter in a gradual fashion may increase the level of quality of the video image. Other methods of configuring the set of computing assets in a gradual fashion may also be possible.

Method 300 concludes at block 399. Aspects of method 300 may provide performance or efficiency benefits for managing dynamic video images. Aspects may save resources such as bandwidth, disk, processing, or memory. As an example, the gradual configuration of the computing assets may conserve battery or improve the battery life of a computing device (e.g., a high level of brightness of a screen may be gradually altered in an automated fashion). The automated gradual configuration of the computing assets may result in minimal user intervention (e.g., eliminating/reducing the need to manually select/modify a display parameter setting from a listing/menu). Other methods of conserving battery life may also be possible.

Figure 4:
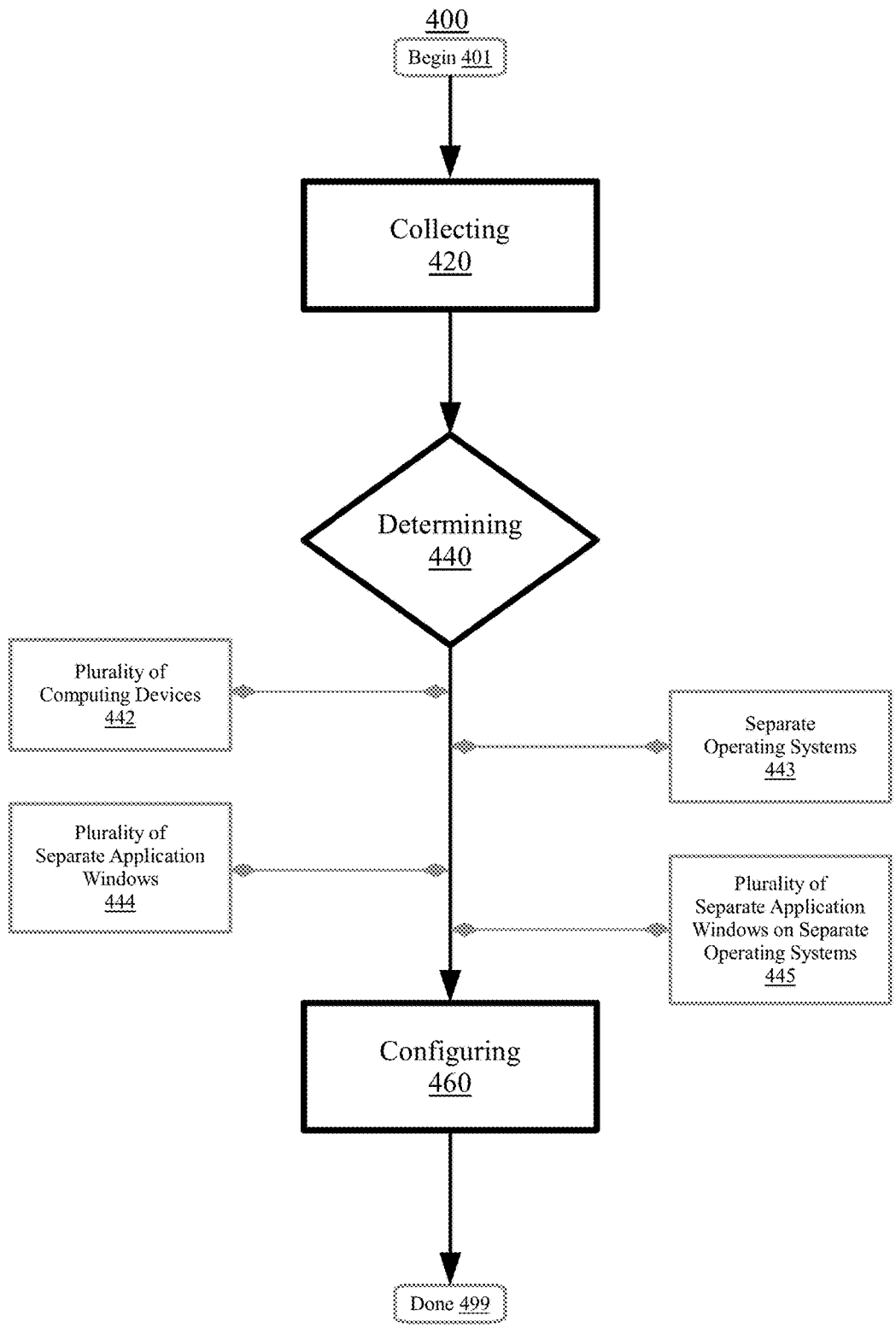
FIG. 4 is a flowchart illustrating a method of dynamic video image management, according to embodiments.

FIG. 4 is a flowchart illustrating a method 400 of dynamic video image management. Aspects of method 400 may be similar or the same as aspects of method 200/300, and aspects may be utilized interchangeably with one or more methodologies described herein. The method 400 may begin at block 401. At block 420, a set of dynamic image quality factors may be collected with respect to a dynamic video image. At block 440, a set of display parameter values may be determined based on the set of dynamic image quality factors. The set of display parameter values may be of a set of display parameters for a set of computing assets. The set of display parameter values may be determined to benefit the set of dynamic image quality factors with respect to the dynamic video image. At block 460, the set of computing assets may be configured to using the set of display parameter values. The set of computing assets may be configured to benefit the set of dynamic image quality factors with respect to the dynamic video image.

In embodiments, the set of computing assets may be structured to include various types, kinds, or natures of assets. In such instances, a respective set of display parameters may be for a respective type, kind, or nature of an asset. Structuring may include grouping, managing, assembling, constructing, configuring, or otherwise formatting the set of computing assets. In certain embodiments, the set of computing assets may be structured to include a plurality of computing devices at block 442. The plurality of computing devices may include different physical display screens, different computers/devices, etc. (e.g., multiple different tablet display screens, various different laptop computers, a combination of one or more display screens and computers). The set of display parameter values may be for the plurality of computing devices. The set of display parameter values (e.g., increasing the color factor by 15%, balancing the temperature to equal levels of warm and cool light) may be for the multitude or combination of the computing devices (e.g., changing the parameter values on one tablet and two computers, maintaining the parameter values on two projectors and one tablet). In certain embodiments, the set of computing assets may be structured to include a plurality of computing devices which utilize separate operating systems at block 443. An operating system may be software that supports the functions (e.g., scheduling tasks, executing applications) of a computing device. The separate operating systems may include the same operating system on different computers, different versions of operating systems (e.g., 7.0 and 7.2, 8.0 and 6.0), different operating systems entirely such as an operating system for Android (trademark of Google Incorporated) and a Windows (trademark of Microsoft Corporation) operating system, or some other combination of operating systems. The set of display parameter values (e.g., modifying the brightness, decreasing the saturation) may be for a combination of multiple operating systems.

In certain embodiments, the set of computing assets may be structured to include a plurality of separate application windows at block 444. The separate application windows may include the same application with different windows (e.g., multiple spreadsheets, a plurality of tabs on an internet browser), different application versions (e.g., an older version of a slideshow presentation application and a newer version of the same application), different applications entirely (e.g., an internet browser and a video chat application), or some other combination of application windows. The set of display parameter values may be for the plurality of separate application windows. The set of display parameter values (e.g., increasing the white balance factor by 30%, decreasing the illumination factor to obtain a level between 40% and 60%) may be for a combination of multiple application windows. In certain embodiments, the set of computing assets may be structured to include a plurality of computing devices at block 445. For example, a plurality of computing device may include the use of a tablet and a projector at the same time, the use of two smartphones with a laptop computer, or other combinations of a plurality of computing devices. The plurality of computing devices may run a plurality of separate operating systems (e.g., version 7.0 and 7.3). The separate operating systems may use a plurality of different applications (e.g., video chat application and spreadsheet). The plurality of different applications may include a plurality of separate application windows for presentation on a plurality of different physical display screens (e.g., video chat application and internet browser on a tablet while using a projector to display a spreadsheet). The set of display parameter values (e.g., modifying the brightness level of a video image, decreasing the saturation of a video image) may be for the plurality of separate application windows (e.g., video chat on a laptop computer and slideshow on a projector screen).

Consider the following example. A user may be using a video chat application in order to communicate with family members across the country during Thanksgiving dinner. The user may be participating in a video chat on their laptop computer while streaming a football game on a projector screen. The reflection of the football game on the face of the user may distort the facial features and dynamic image quality factors. As an example, the green grass of the football field may cause the face of the user to be tinted green. The user may not want to appear green in the video image. A set of dynamic image quality factors may be collected, which may include a green color factor of 75%. The determined set of display parameter values may include the lowering of the green color factor to 25%. The configuration may occur on either device or both devices. The display image of the game on the projector may be configured such that the green color factor is decreased to 25%. The display image of the user in their video chat may be configured such that the green color factor is decreased to 25%. The display image of the game may decrease the green color factor by 30% while the display image of the user may decrease the green color factor by 20%. The projector and the laptop computer may utilize separate operating systems (e.g., Android and Windows). The projector and the laptop may include a plurality of separate application windows. The video chat application may have several windows opened in order to communicate with several family members at various locations at the same time (e.g., three different video chat applications, four different windows of the same video chat application). The projector may be configured such that the user is able to watch two different games at the same time (e.g., two different games on two different tabs of the same internet browser, two different games using two different internet browsers). The laptop computer and projector may be configured to include multiple devices, multiple separate operating systems, multiple separate application windows, or any combination of devices, operating systems, and application windows. Other examples of structuring the set of computing assets to include various types of assets may also be possible.

Method 400 concludes at block 499. Aspects of method 400 may provide performance or efficiency benefits for managing dynamic video images. Aspects may save resources such as bandwidth, disk, processing, or memory. As an example, using a plurality of computing devices for dynamic video image management may save memory (e.g., adjusting the video image on a tablet but not on a laptop may save memory on the laptop). Memory may be saved, for example, by the camera on one device not constantly having to make adjustments. Other methods of conserving memory may also be possible.

Figure 5:
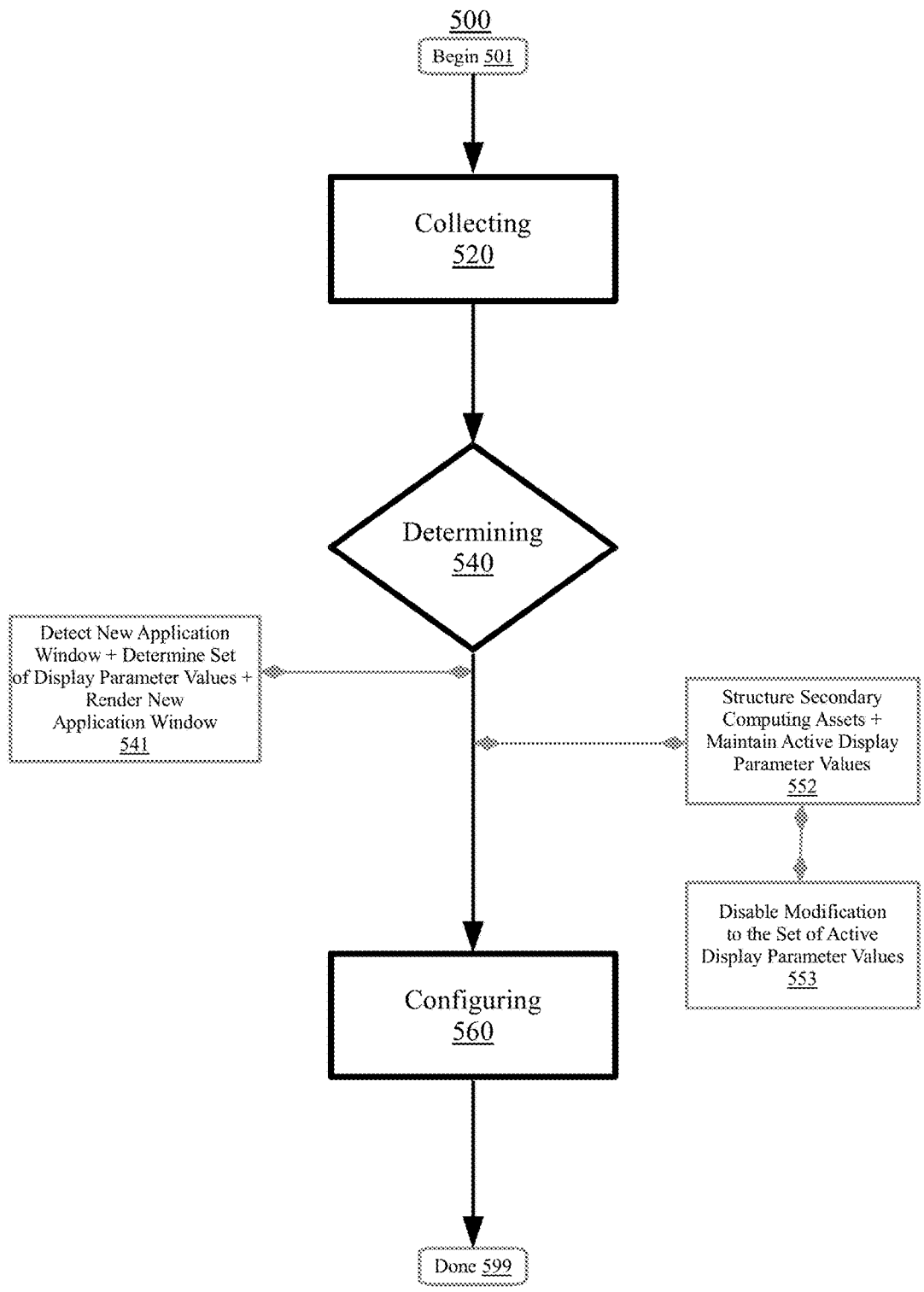
FIG. 5 is a flowchart illustrating a method of dynamic video image management, according to embodiments.

FIG. 5 is a flowchart illustrating a method 500 of dynamic video image management. Aspects of method 500 may be similar or the same as aspects of method 200/300/400, and aspects may be utilized interchangeably with one or more methodologies described herein. The method 500 may begin at block 501. At block 520, a set of dynamic image quality factors may be collected with respect to a dynamic video image. At block 540, a set of display parameter values may be determined based on the set of dynamic image quality factors. The set of display parameter values may be of a set of display parameters for a set of computing assets. The set of display parameter values may be determined to benefit the set of dynamic image quality factors with respect to the dynamic video image. At block 560, the set of computing assets may be configured to using the set of display parameter values. The set of computing assets may be configured to benefit the set of dynamic image quality factors with respect to the dynamic video image.

In embodiments, a new application window may occur at block 541. A triggering event may be detected. Detecting can include sensing, identifying, or otherwise recognizing a triggering event. A triggering event can include a machine-generated or user-generated occurrence or event that may cause another event to occur (e.g., detecting that the new tab button on an internet browser has been clicked, detecting that the website is about to provide a pop-up message, detecting that an application program is initiating a new process which will modify one or more window sizes of one or more running instances of the application program). The triggering event may indicate a new application window is to be rendered. Indicating can include signaling, specifying, or otherwise denoting a new application window is to be rendered (e.g., the opening of a new spreadsheet, the rendering of a video chat application). The set of display parameter values of the set of display parameters may be determined for the new application window. Determining can include resolving, establishing, or otherwise ascertaining the set of display parameter values for the new application window (e.g., decreasing the brightness factor of a spreadsheet, maintaining the saturation factor of a new video conversation). The set of display parameter values may be determined based on the set of dynamic image quality factors. The set of display parameter values may be determined to benefit the set of dynamic image quality factors with respect to the dynamic video image. The set of display parameter values may be determined to increase the level of quality of the video image. The new application window may be rendered. Rendering may include implementing, establishing, developing, opening, or otherwise introducing the new application window. The new application window may be rendered using the set of display parameter values of the set of display parameters for the new application window.

Consider the following example. A user may be giving a presentation at work while taking part in a video conference call. The user may be using their laptop computer to record the video image while a spreadsheet is being shown on a projector screen. The user may need to open an additional spreadsheet tab on the projector screen that is displaying the original spreadsheet. The user may click the tab to open the second spreadsheet. The set of display parameter values may be determined for the second spreadsheet to benefit the set of dynamic image quality factors. The second spreadsheet may have a higher level of brightness than the first (e.g., 70% compared to 40%). The rendering of the second spreadsheet may modify the dynamic image quality factors. The rendering of the second spreadsheet may distort or decrease the quality of the video image on the devices of the colleagues of the user. The set of display parameter values may be determined for the second spreadsheet before the second spreadsheet is rendered. The set of display parameter values may include lowering the level of brightness on the display screen by 30% once the second spreadsheet is opened. Once the set of display parameter values for the second spreadsheet have been determined, the second spreadsheet may be rendered. The video image quality may not decrease since the set of display parameter values was determined for the second spreadsheet before it was opened. Other methods of rendering a new application window may also occur.

In embodiments, structuring and maintaining may occur at block 552. The set of computing assets may be structured to include a set of secondary computing assets. Structuring may include managing, assembling, composing, or otherwise configuring the set of computing assets to include a set of secondary computing assets. The set of secondary computing assets may include open but inactive windows or applications (e.g., an application playing music in the background, an internet tab that has been minimized for use at a later point in a presentation). The set of active display parameter values of the set of active display parameters for the set of active computing assets may be maintained. Maintaining may include controlling, managing, preserving, or otherwise sustaining the set of active display parameter values for the set of active computing assets (e.g., maintaining the current level of color on a slideshow presentation on a projector screen). The set of active display parameter values may be maintained to configure the set of computing assets. The set of computing assets may be configured without changing a set of active display parameter values of a set of active display parameters for a set of active computing assets (e.g., the application currently in use).

Consider the following example. A user may be video chatting with a friend using a tablet while sitting outside in the sun. The user may also have an internet browser open as a primary application, while the video chat application may be open in the background as the secondary application. While using the internet browser, the level of brightness may have been increased to 90% in order for the user to see the screen while sitting outside. While using the video chat application, the level of brightness may be decreased to 50% in order to prevent distortion of the image of the video image of the friend. The tablet may be structured to include the background secondary application, the video chat application. The active display parameter values may be maintained while the user is viewing the internet browser. The level of brightness may remain at a lower level of 50% while the video chatting application remains active. Other methods of structuring and maintaining to include a set of secondary computing assets may also be possible.

In embodiments, a modification to the set of active display parameters may be disabled at block 553. Disabling can include restricting, deactivating, preventing, or otherwise hindering a modification to the set of active display parameters. A modification to the set of active display parameter values of the set of active display parameters for the set of active computing assets may be disabled for a threshold temporal period. The modification to the set of active display parameter values may be disabled when a user switches to a different application window for a certain temporal period before the previously active window may be subject to aspects described herein. For example, when a user switches from a slideshow to a spreadsheet, the slideshow may remain illuminated for a temporal period of five minutes. At the end of the five minutes, the slideshow may darken because it is no longer considered an active window.

Consider the following example. A user may be a participant in a video conference call at work using their laptop computer. The user may also have multiple screens behind them to display various spreadsheets. The spreadsheets may have a set of display parameter values which indicate a contrast factor of 55%. The user may open an image on another screen. The image may have a set of display parameter values which indicate a contrast level of 75%. The modification to the set of the active display parameter values may be disabled. The opening of the image on a new screen may not cause the contrast level of the spreadsheets to change immediately. Once the image has been open for a temporal period (e.g., five minutes), it may be determined that the image is the active application, not the spreadsheets. The contrast level of the spreadsheets may increase at this time (e.g., after the five minute temporal period). The user may not need to show the image for a long amount of time (e.g., the image is only visible for ten seconds). Rather than modifying the contrast of the image for only ten seconds, the system may disable the modification of the contrast, since ten seconds does not exceed a temporal period of five minutes. The user may also be opening several new spreadsheet windows in a short period of time. The system may want to wait until the computing device has a more stable setup before making any changes to the contrast parameter. The system may want to wait until a particular window has been active or primary for a temporal period (e.g., two minutes). Once a particular window has been the primary window for two minutes, the projector may then be configured to benefit the set of dynamic image quality factors. Other examples of disabling a modification to the set of active display parameter values may also occur.

Method 500 concludes at block 599. Aspects of method 500 may provide performance or efficiency benefits for managing dynamic video images. Aspects may save resources such as bandwidth, disk, processing, or memory (as described herein).

Figure 6:
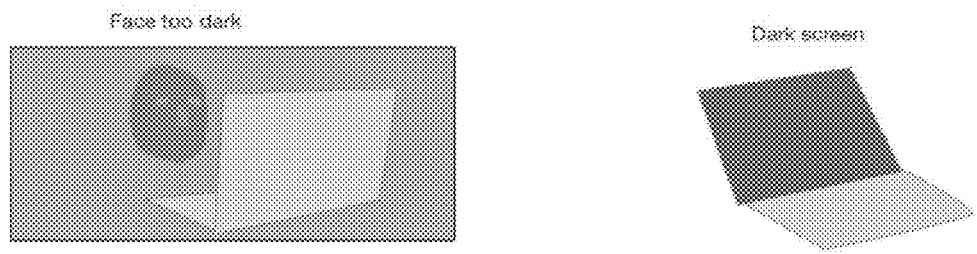
FIG. 6 illustrates an example system for dynamic video image management, according to embodiments.
Figure 6:
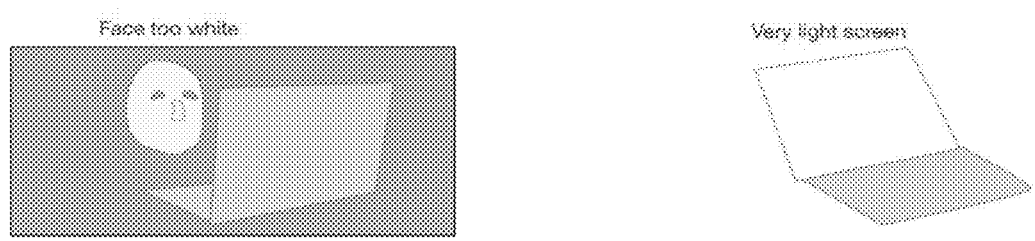

FIG. 6 illustrates an example system 600 for dynamic video image management, according to embodiments. As an example, in configuration 610, the screen of a device may be dark, resulting in the face of the user appearing dark. In configuration 630, the screen of a device may be very light, resulting in the face of the user appearing too white. The dynamic image quality factors may be collected, indicating that a lower quality image exists and that a higher quality image may be desired. Consider the following example. A user may be participating in a video chat conversation with a friend using a tablet. A set of dynamic image quality factors may be collected based on the dynamic video image. The set of dynamic image quality factors may include a 10% white balance factor and a 75% saturation factor. The set of dynamic image quality factors may be based on a set of facial-related features. For example, the indicated low level of white balance may be based on the teeth of the user appearing yellow. The indicated high level of saturation may be based on the skin tone of the user appearing orange. The user may appear unnatural and the colors of their environment may appear too intense. A set of original display parameter values may be identified for the tablet. For example, if the user frequently video chats in a room with bright, intense, heavily saturated walls, the tablet may be configured to have an original level of saturation of no more than 75%. If the 75% saturation factor is still too high, the set of original display parameter values may be changed to an original level of saturation of no more than 65%.

A set of display parameter values may be determined for the tablet of the user described herein. The set of display parameter values may include the raising or lowering of the dynamic image quality factors, such as raising the white balance factor to a predetermined benchmark value of 70% and decreasing the saturation factor to within a range of 30-50%. The tablet may be configured to benefit the set of dynamic image quality factors. The white balance factor may be increased to the benchmark value of 70%. The saturation factor may be reduced to 40% to fall within the desired range of 30-50%. The video camera configuration of the tablet may be maintained. The display screen of the tablet may be configured to include a higher level of white balance and a lower level of saturation, but the video camera configuration will not change. The dynamic image quality factors, such as the level of saturation, may be lowered in a gradual fashion. For example, the level of saturation may decrease by a 5% increment every ten seconds.

Figure 7:
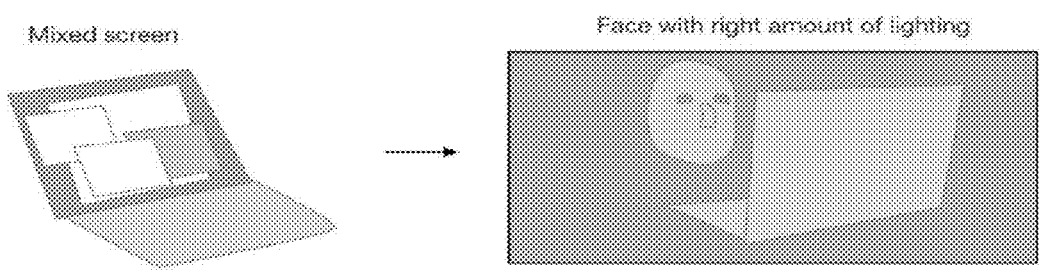
FIG. 7 illustrates an example system for dynamic video image management, according to embodiments.
Figure 7:
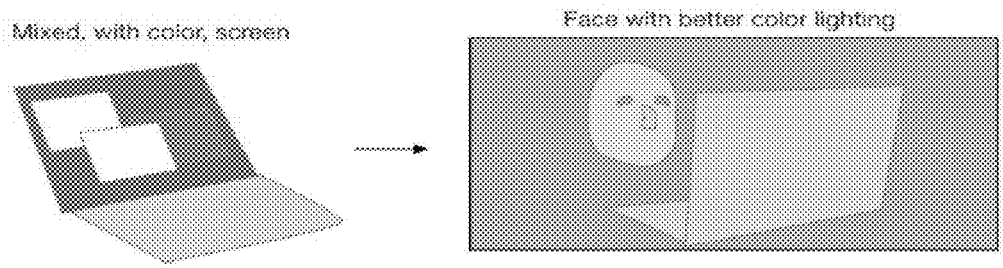

FIG. 7 illustrates an example system 700 for dynamic video image management, according to embodiments. As an example, in configuration 710, the user may have several applications open at one time. The display may need to be configured such that every application is taken into account in order to benefit the dynamic image quality factors and the dynamic video image. In configuration 730, the screen may include several different colors. The display may need to be configured such that the color factor may not distort the appearance of the user. Consider the following example. The user described herein may need to open a new application, such as a new video chat window, to communicate with another friend at the same time. The user may click the button to open a new conversation window, which may indicate a triggering event. The set of display parameter values for the new conversation window may be determined before the new window is opened. For example, the new window may need to be configured for a different set of dynamic image quality factors, such as a lower level of brightness. The new conversation window may only be active for two minutes, which may be a shorter length of time than a threshold temporal period of five minutes. Since the new conversation window is not open for a long enough amount of time, the tablet may not be configured such that the brightness is lowered to accommodate for the new conversation window. The user may be using a plurality of devices, such as also having their laptop open while video chatting on the tablet. The laptop may also be configured to enhance the quality of the video image on the tablet. The laptop and the tablet may use separate operating systems. The laptop and the tablet may also use different versions of the same operating system (e.g., 7.0 and 7.3). The user may have several application windows open during the video chat. For example, the user may have two video chats open on the tablet. The user may have a video chat application and an internet browser open on the tablet. The user may have a video chat open on the tablet and an internet browser open on the laptop. The dynamic image quality factors may be modified for all of these scenarios involving a plurality of computing devices, a plurality of separate operating systems, a plurality of separate application windows, or a combination of these assets. Other example systems may also be possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer system for dynamic video image management, the computer system comprising a computer readable memory, a processing unit communicatively coupled to the computer readable memory, computer readable storage medium, and program instructions stored on the computer readable storage medium for execution by the processing unit via the computer readable memory, the program instructions comprising:
   program instructions to collect, with respect to a dynamic video image, a set of dynamic image quality factors;
   program instructions to determine, based on the set of dynamic image quality factors, a set of display parameter values of a set of display parameters for a set of computing assets to benefit the set of dynamic image quality factors with respect to the dynamic video image;
   program instructions to configure, using the set of display parameter values, the set of computing assets to benefit the set of dynamic image quality factors with respect to the dynamic video image;
   program instructions to maintain, to configure the set of computing assets without changing a video camera configuration, the video camera configuration;
   program instructions to structure the set of computing assets to include a set of secondary computing assets;
   program instructions to maintain, to configure the set of computing assets without changing a set of active display parameter values of a set of active display parameters for a set of active computing assets, the set of active display parameter values of the set of active display parameters for the set of active computing assets;
   program instructions to disable, for a threshold temporal period, a modification to the set of active display parameter values of the set of active display parameters for the set of active computing assets;
   program instructions to structure the set of secondary computing assets to include a plurality of computing devices which run a plurality of separate operating systems which have a plurality of different applications which include a plurality of separate application windows for presentation on a plurality of different physical display screens, wherein the set of display parameter values is for the plurality of separate application windows; and
   program instructions to configure the set of secondary computing assets in a gradual fashion to manage the dynamic video image based on a set of incremental changes to the set of display parameter values.

2. The computer system of claim 1, further comprising:
   program instructions to capture, using a set of camera sensors, a set of facial-related features associated with the dynamic video image to collect the set of dynamic image quality factors.

3. The computer system of claim 2, further comprising:
   program instructions to evaluate, to benefit presentation of the set of facial-related features, the set of dynamic image quality factors with respect to a set of image quality factor benchmarks; and
   program instructions to select, to benefit presentation of the set of facial-related features, the set of display parameter values based on the evaluation of the set of dynamic image quality factors with respect to the set of image quality factor benchmarks.

4. The computer system of claim 1, further comprising:
   program instructions to identify, in advance of determining the set of display parameter values of the set of display parameters for the set of computing assets, a set of original display parameter values for the set of computing assets with respect to the dynamic video image; and
   program instructions to change, to benefit the set of dynamic image quality factors with respect to the dynamic video image, the set of original display parameter values of the set of display parameters for the set of computing assets to the set of display parameter values of the set of display parameters for the set of computing assets.

5. The computer system of claim 1, further comprising:
   program instructions to structure the set of computing assets to include the plurality of computing devices, wherein the set of display parameter values is for the plurality of computing devices.

6. The computer system of claim 1, further comprising:
   program instructions to structure the set of computing assets to include a plurality of computing devices which utilize separate operating systems, wherein the set of display parameter values is for the separate operating systems.

7. The computer system of claim 1, further comprising:
   program instructions to structure the set of computing assets to include the plurality of separate application windows, wherein the set of display parameter values is for the plurality of separate application windows.

8. The computer system of claim 1, further comprising:
   program instructions to structure the set of computing assets to include the plurality of computing devices which run a plurality of separate operating systems which have a plurality of different applications which include a plurality of separate application windows for presentation on a plurality of different physical display screens, wherein the set of display parameter values is for the plurality of separate application windows.

9. The computer system of claim 1, further comprising:
   program instructions to detect a triggering event which indicates a new application window is to be rendered;
   program instructions to determine, based on the set of dynamic image quality factors, the set of display parameter values of the set of display parameters for the new application window to benefit the set of dynamic image quality factors with respect to the dynamic video image; and
   program instructions to render, using the set of display parameter values of the set of display parameters for the new application window, the new application window.

10. The computer system of claim 1, further comprising:
    program instructions to configure the set of computing assets in a gradual fashion to manage the dynamic video image based on a set of incremental changes to the set of display parameter values.

11. The computer system of claim 1, wherein the program instructions to collect, the program instructions to determine, and the program instructions to configure each occur in a dynamic fashion to streamline dynamic video image management.

12. The computer system of claim 1, wherein the program instructions to collect, the program instructions to determine, and the program instructions to configure each occur in an automated fashion without user intervention.

\* \* \* \* \*